Dec. 26, 1939.  M. E. COLLINS  2,184,546
FILM IDENTIFYING APPARATUS
Filed May 28, 1938  3 Sheets-Sheet 1

Inventor
Milford E. Collins

By

ATTORNEY

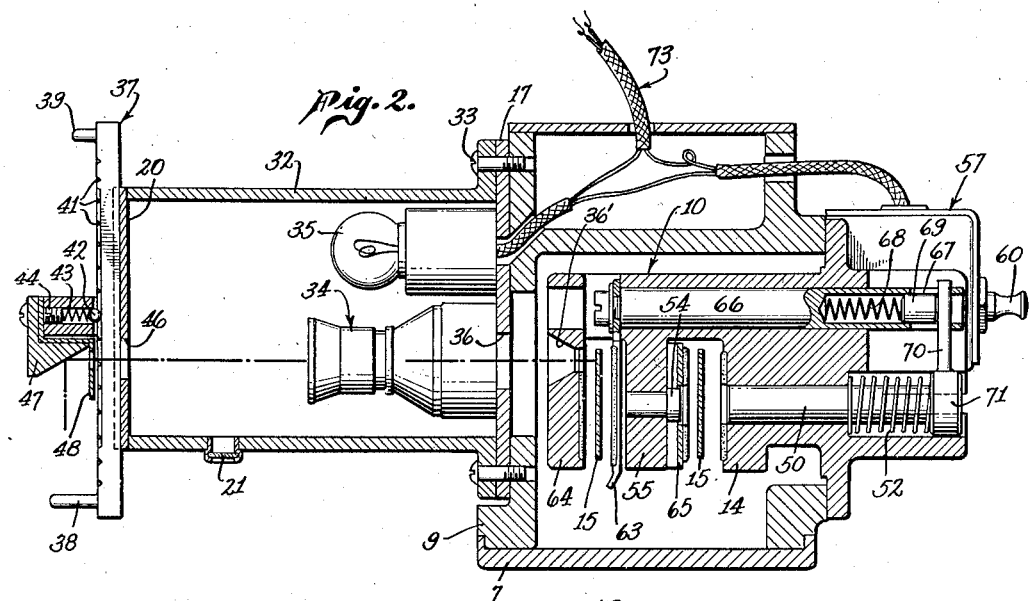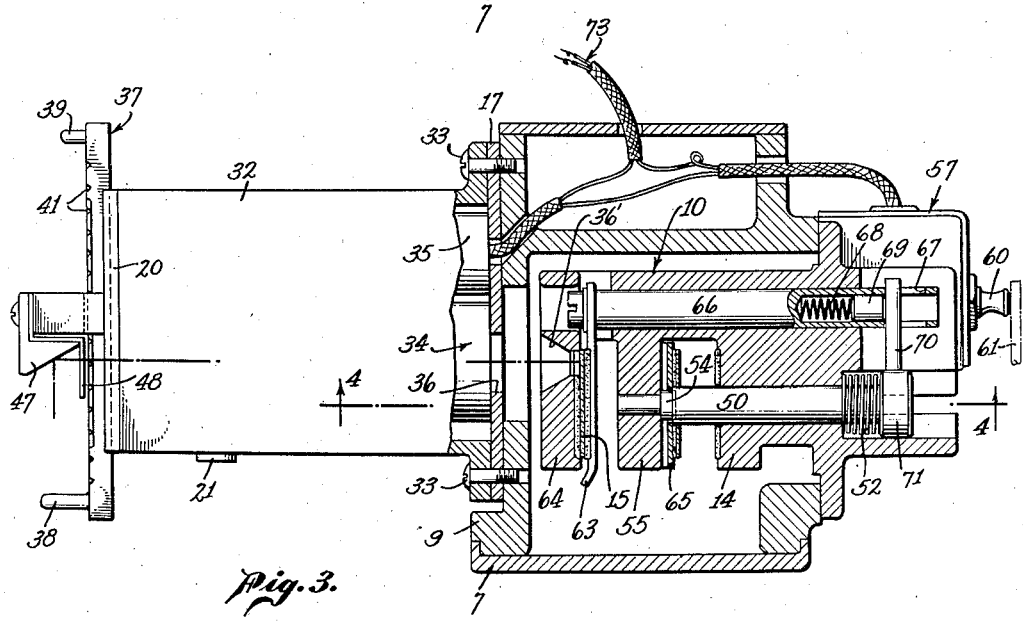

Dec. 26, 1939.   M. E. COLLINS   2,184,546
FILM IDENTIFYING APPARATUS
Filed May 28, 1938   3 Sheets-Sheet 3

Inventor
Milford E. Collins
By Irl R. Goshaw
ATTORNEY

Patented Dec. 26, 1939

2,184,546

UNITED STATES PATENT OFFICE 2,184,546

FILM IDENTIFYING APPARATUS

Milford E. Collins, Hollywood, Calif., assignor to Radio Corporation of America, a corporation of Delaware Application May 28, 1938, Serial No. 210,660

13 Claims. (Cl. 95—1.1)

This invention relates to motion picture apparatus and particularly to an attachment or a portion of a film sound recorder whereby a certain section of a sound negative film is identified by markings impressed thereon prior and/or after a take or sequence has been made or recorded.

In the art of sound recording on film, the sound recorder or camera is usually a separate unit from the picture camera and is generally located at a point distant from the set where the picture is being photographed. It is well known in the art that the picture camera and sound recorder are synchronized so that the respective negative films are advanced at the same speed for subsequent combination on a single print. It is also well known in the art of motion picture making that each scene constitutes a sequence which is taken individually and at different time intervals with respect to other related sequences. In a single day's shooting, many sequences of a length from one foot to several hundred feet are recorded, a number of sequences being taken on a single roll of film.

The usual method of identifying the various picture takes or sequences is by the use of a slate held in front of the camera at the beginning and/or end of each take and on which the name of the picture, title and number of each take is written. At the sound recorder, the soundman usually has a plurality of punches bearing different numbers or indicia with which he punches the film before and/or after each corresponding sound take. The portion of the sound film punched is that within the recorder, thus necessitating the opening of the recorder which exposes considerable film.

The present invention not only eliminates the necessity of exposing any film but permits, by one action of the operator, the film to be marked with a plurality of indicia indicating the picture, title, take, etc., at the same time that a hole is punched in the film for identifying the beg'nnings and ends of takes in the darkroom. The changes in indicia can be made exteriorly of the recorder quickly and accurately. The identification marks are photographically impressed on the film simultaneously with the punching of the hole, the present invention being directed to the mechanism for accomplishing the photographing and punching.

An object of the invention, therefore, is to facilitate the identification of a sound take either before or after the recording thereof.

Another object of the invention is to simultaneously mark a film with a plurality of indicia for identifying a take from others on a film roll and to indicate the beginning and end of a take before developing.

A further object of the invention is to facilitate the changing of the identification indicia by varying the indicia externally of the recorder.

Although the novel features which are believed to be characteristic of this invention will be pointed out with particularity in the claims appended hereto, the manner of its organization and the mode of its operation will be better understood by referring to the following description read in conjunction with the accompanying drawings forming a part hereof, in which:

Figure 2 is a plan, cross-sectional view taken along the line 2—2 of Fig. 1;

Figure 3 is a plan view similar to Fig. 2 showing the position of the movable marking elements at the instant of functioning;

Figure 1:
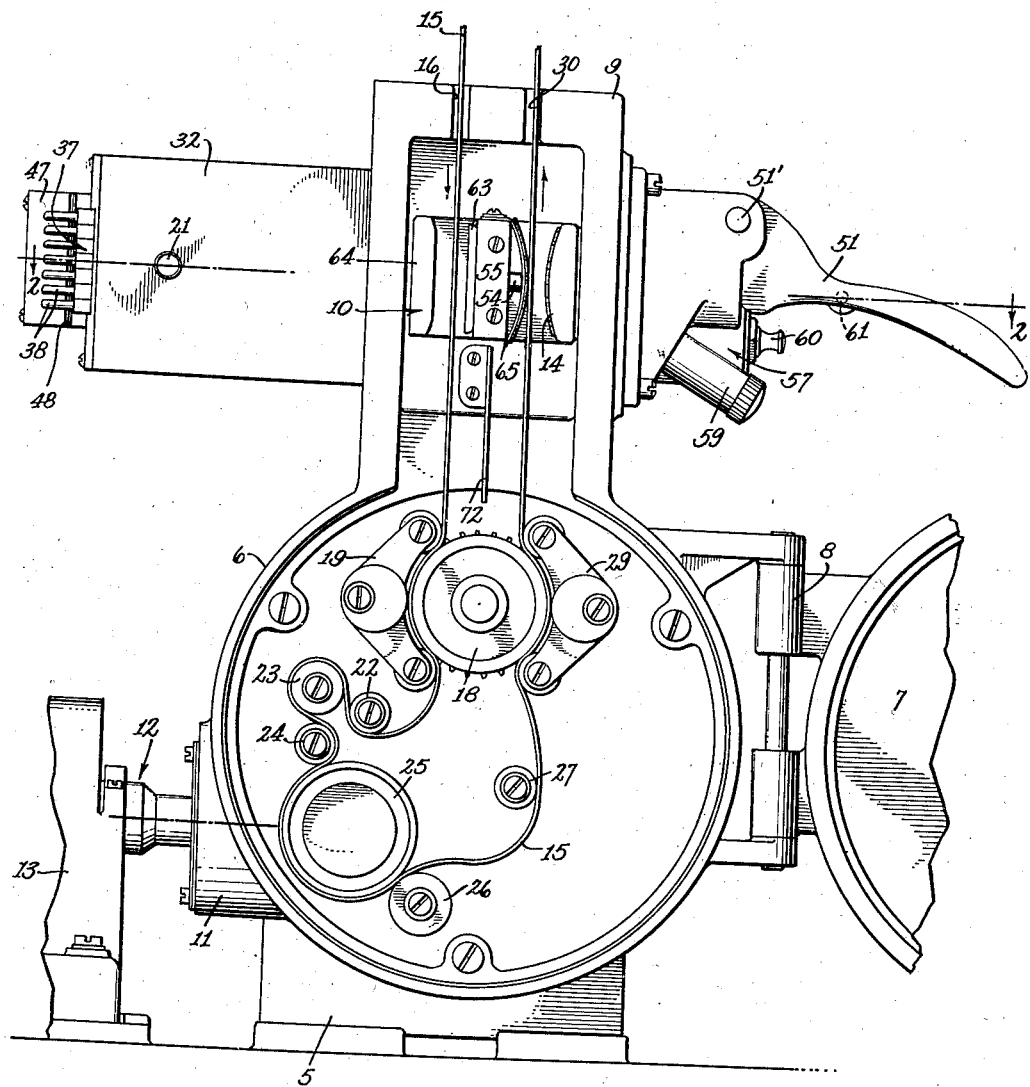
Figure 1 is an elevational view of the film marker showing the film path through the recorder.

Referring now to the figures in which like numerals identify the same elements, the portion of a recorder shown has a base 5 upon which is mounted a housing having a cylindrical portion 6 and an integral upper rectangular portion 9. A door 7 is hinged at 8, the door 7 also having an upper extension (not shown) to conform with and close the opening in the portion 9. A boss 11 contains an opening into the housing 6 through which modulated light is projected through an optical assembly 12 mounted on a support 13.

Within the housing 6—9, the path of a film 15 is shown as entering through a slot 16 through which is pulled by passing around the left-hand side of a sprocket 18 on which it is held by a pad roller 19. From the sprocket 18 the film passes around wrapping and edge-guide rollers 22, 23 and 24 to a drum 25. A pressure roller 26 determines the film wrap around roller 25 while a roller 27 functions during starting when the film is pulled by the right-hand side of sprocket 18 on which it is held by a pad roller 29. The film then passes upwardly through a slot 30 in the housing portion 9. A film magazine (not shown) is mounted on the top of portion 9 to supply and take up the film through the recorder.

In passing through portion 9, which has a yoke element 10 extending therein, the film passes between a flat, fixed pressure plate 64 and a flat, movable pressure pad 63 on its downward course; and between a fixed, curved guide 14 and a curved movable spring 65 on its upper course. The surfaces of these elements are covered with black felt to prevent film damage and light reflection. To aid in film direction, a felt covered fin 72 is positioned below the yoke 10 and attached to the back wall of section 9. The purpose of these elements will be described hereinafter.

Figure 5:
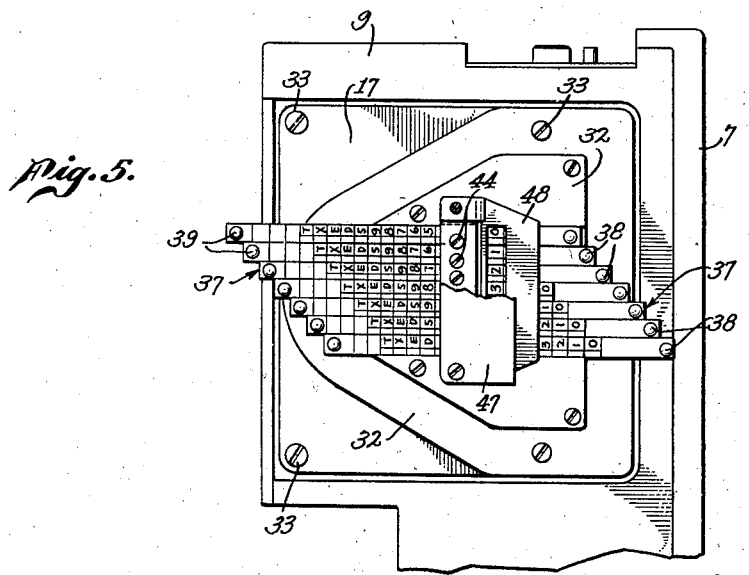
Figure 5 is a detailed view of the indicia elements of the marking device.

On the left-hand side of housing portion 9, there is attached a triangle light-tight housing 32 attached by screws 33. Between the mounting flange of housing 32 is a cover plate 17 on which is mounted a photographic optical assembly 34 and an exposure lamp 35. Attached to the left-hand end of housing 32 is a plate 20 having an aperture 46 therein through which is exposed one side of a series of slides 37 (see Fig. 5) carrying indicia such as numbers, letters, or the like. The same numeral or letter is placed on both sides of respective slides directly opposite each other so by observing the sides shown in Fig. 5, the particular numeral or letter positioned at aperture 46 is known. Each slide has extensions 38 and 39 at respective ends thereof for manual movement longitudinally, uniform elements of movement being determined by V-type notches 41 cut therein. The notches cooperate with balls 42 pressed toward the indicia slides by springs 43 held in position by set screws 44 (see Fig. 2). This notch and spring pressed ball arrangement also maintains each indicia of the slides in alignment with the aperture 46.

The purpose of positioning the indicia at aperture 46 is to photograph them by light from lamp 35 on film lying between members 63 and 64 of the yoke 10 in the housing portion 9, the image being projected through an aperture 36 in plate 17 and an aperture 36' in member 64. This is accomplished by energizing lamp 35, as will be explained later, a ruby glass 21 permitting observation of the energization of the lamp. To facilitate reading of the indicia by an operator directly in front of the recorder, a 45° reflector 47 is positioned as shown to shift the angle of observation 90°, while an apertured shield 48 positioned directly opposite aperture 46 exposes only one section of each slide. Thus, to photograph on the film a series of numbers or letters identifying a take, the slides 37 are set to position the indicia at aperture 46, and the lamp 35 is energized to illuminate the indicia, the image of which is projected upon the film through openings 36 and 36' within the housing portion 9.

Simultaneously with the photographing of the indicia on the film, the film is simultaneously punched with a hole in the center thereof by a movable hollow die rod 50 actuated by a handle 51 pivoted at 51'. The reaction of a compression spring 52 returns the rod 50 and handle 51 to their normal positions. As the die rod 50 moves to the left, it first presses the film against the curved spring 65 and then moves both film and spring toward a stationary punch rod 54 mounted on the central portion 55 of the extension 10. A hole has been placed in the spring 65 so that the film can be brought in contact with the rod 54 and punched. Upon retraction of rod 50, the spring 65 frees the film from the rod 51 and maintains the film away from the end of the punch rod 54 during normal operation of the recorder. The portions of the film punched out pass through the center of the die rod 50 and fall through an opening therein into a conduit 58, from whence they are collected in a removable cap member 59.

Thus, a hole is punched in the center of the film by actuation of the handle 51 downwardly, which moves the die rod 50 into cooperative relation with punch rod 54. Simultaneous with this action, however, the lamp 35 is energized, energization being accomplished by the actuation of a self-restoring switch located at 57 and having an external actuating member 60 which is contacted by an extension 61 from the handle 51. That is, when the handle 51 is moved downwardly, the extension 61 contacts the switch just before the handle 51 reaches its limit of movement. Thus, the lamp 35 is energized at substantially the instant the hole is punched in the film.

Figure 4:
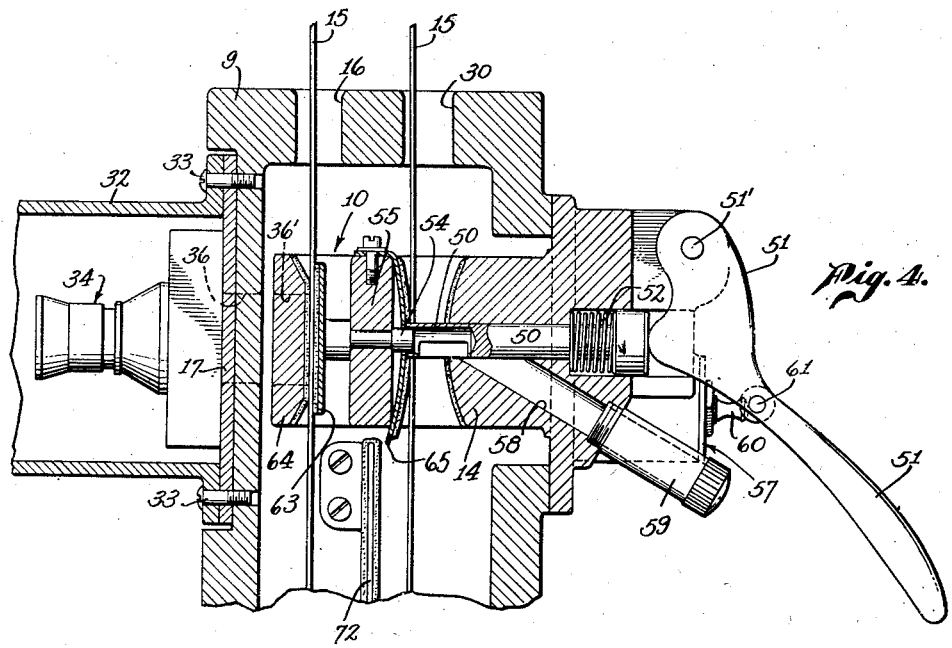
Figure 4 is an elevational, cross-sectional view taken along the line 4—4 of Fig. 3.

Movement of the handle 51, however, also performs a third function. If the film, between pads 63 and 64, were allowed to remain free, there would be no way of determining whether or not the image of the indicia was in focus on the film. Therefore, to insure that the surface of the film is in accurate focus during the photographing of the indicia, the film is maintained in a fixed plane by being pressed against flat, fixed plate 64 by flat pressure pad 63 mounted on a rod 66 having a notch or opening 67 therein. The rod 66 is partially hollow and contains a compression spring 68 abutting a block 69. A pin 70 extending horizontally from the head 71 of the die member 50 is positioned in the notch 67 between the block 69 and the end of rod 66. Thus, movement of the die rod 50 toward the left actuates extension 70 against block 69, the spring compression being sufficient to immediately move the pressure plate 63 to the left to hold the film tightly against the member 64. The film reaches pad 64 an instant before extension 61 contacts switch element 60, and further movement of handle 51 to actuate the switch and punch the film only compresses spring 68. The positions of the actuated elements for positioning and punching the film and energizing the lamp are shown in Figs. 3 and 4 while the normal positions are shown in the other figures. Energy is supplied to the lamp 35 over conductors 73, which, of course, are connected through the switch.

Thus, the single movement of the handle 51 downwardly accomplishes three functions simultaneously or substantially so. That is, as the handle moves downwardly, the die member 50 is moved toward the left simultaneously with the movement of the rod 66, the rod 66 moving plate 63 against the film 15. As the handle continues its downward movement, the film 15 is pressed against the pad 64, the die rod 50 presses the film on the punch rod 54 to punch it, and the extension 61 from the handle 51 actuates the switch 60, energizing the lamp 35 which illuminates the indicia on the slides 37 for photographing on the film 15. The spring 52 returns the die rod 50, rod 66 and handle 51 to their normal positions, the self-restoring switch deenergizing the lamp when the pressure is removed.

Thus, the operator, when he receives knowledge of the title of the picture, the scene, the take, or any other information, can set the slides 37 accordingly without opening the door 7. To mark or record the data on the film, he need only depress the handle 51, which simultaneously punches a hole a definite distance ahead of the identification numbers to designate the beginning of the take. At the end of the take the handle may again be depressed to indicate the end thereof by a punch-hole and again identify it by photographing the indicia thereon.

I claim as my invention:

1. In an identifying device for motion picture film, the combination of a light-tight conduit for guiding a film to and from a translation point, means for photographing indicia on said film in said conduit, said indicia being adjustable exteriorly of said conduit, means for adjusting said film in a predetermined plane for photographing said indicia thereon, means in said conduit for removing a portion of said film, and means for simultaneously operating said photographing means, said film removing means and said film adjusting means.

2. A marking device for motion picture films comprising a light-tight conduit for guiding a motion picture film to and from a translation point, means positioned in said conduit for separating the paths of said film, means in one of said paths for positioning said film in a predetermined plane, means in the other of said paths for removing a portion of said film, means attached to said conduit for projecting an image on said film in the first of said paths, and means operative exteriorly of said conduit for actuating said means for positioning said film in said predetermined plane, said means for removing a portion of said film and said image projecting means.

3. A film marking device comprising a casing, a portion of which houses a constant speed film advancing mechanism and a second portion of which houses means for separating the film into paths into and out of said first-mentioned portion, means in said second portion for removing a portion of said film, means associated with said second portion for photographing indicia on said film, and means associated with said second-mentioned portion for simultaneously removing a portion of said film while photographing said indicia on said film.

4. A film marking device comprising a light-tight conduit for guiding film to and from a translation point, a light-tight housing attached to said conduit, said conduit and housing having communicating apertures, a source of light in said housing, said source being normally de-energized, means attached to said housing for positioning different indicia in position to be illuminated by said source of light, and means adapted to be manually operated for periodically positioning said film in a predetermined fixed plane while simultaneously energizing said source of light for projecting said indicia on said film.

5. A film marking device in accordance with claim 4 in which said plurality of indicia is carried by a plurality of slides individually adjustable in position to be illuminated by said source of light, the indicia illuminated being observable at right angles to the sides of said slides.

6. A film marking device comprising a light-tight conduit for guiding film to and from a translation point, a housing attached to said conduit having an aperture therein communicating with film in said conduit, a plurality of slides adjustable past said housing, said slides carrying indicia for positioning at said aperture, indicia positioned on the opposite sides of said slides for indicating the indicia positioned at said aperture, means for maintaining any of said indicia at predetermined positions at said aperture, and means for varying the angle of observation of said indicia.

7. A film marking device comprising a light-tight housing, means within said housing for determining two film paths, means in one of said paths for determining a definite plane for said film, means in said other path for removing a portion of said film, a portion of said last-mentioned means projecting externally of said housing, and means operative externally of said housing for operating said film plane determining means and said film removing means.

8. A film marking device in accordance with claim 7 in which said film removing means extend externally of said housing, with means associated therewith for collecting the removed portions of said film externally of said housing.

9. A film marking device comprising a casing having a cylindrical portion and a rectangular portion integral therewith, means in said cylindrical portion for advancing said film uniformly through a light beam projected therein, means in said rectangular portion for guiding said film to and from said cylindrical portion in predetermined paths, means in one of said paths for removing a portion of said film, means in the other of said paths for positioning said film in a predetermined plane, means attached to said rectangular portion having an aperture therein communicating with said rectangular portion for projecting indicia on said film when in said predetermined plane, and means exteriorly of said rectangular portion for actuating said film positioning means, and said means for removing a portion of said film and for energizing said photographing means substantially simultaneously.

10. A device for varying film identifying indicia comprising a mounting plate having an aperture therein through which indicia may be illuminated, a plurality of slides adjacent said aperture for carrying said indicia, said slides being adapted to have the same indicia mounted on the opposite sides thereof, means associated with each of said slides for maintaining said slides in any adjusted position at said aperture, and means adjacent said indicia for varying the angle of observation of said indicia.

11. A film identifying device comprising a light-tight film conduit, means for photographing a plurality of indicia at predetermined positions on a sound negative in said conduit, means for varying said indicia exteriorly of said conduit, means for punching said film in said conduit, means for positioning the surface of a portion of said film in said conduit, and means for actuating said punching, photographing and surface positioning means.

12. A marking device for producing reference characters on a film, said device comprising a light-tight chamber having a lens mounted on one wall thereof, a plurality of adjustable character bearing surfaces mounted on another wall thereof, a light source within said chamber, means for advancing said film past said lens, and manually operative means external of said chamber for simultaneously-adjusting said film in focus with said character bearing surfaces and for energizing said light source.

13. A marking device for producing reference characters and start marks on a film, said device comprising a light-tight chamber having a lens mounted on one wall thereof, a plurality of adjustable character bearing surfaces mounted on another wall thereof, a light source within said chamber, means adjacent said lens for positioning a film in focus with said character bearing surfaces, means for marking said film, and manually operative means external of said chamber for actuating said marking means, said focusing means, and for energizing said light source.

MILFORD E. COLLINS.